US011873707B2

(12) United States Patent
Madasu et al.

(10) Patent No.: US 11,873,707 B2
(45) Date of Patent: Jan. 16, 2024

(54) RATE OF PENETRATION OPTIMIZATION FOR WELLBORES USING MACHINE LEARNING

(71) Applicant: LANDMARK GRAPHICS CORPORATION, Houston, TX (US)

(72) Inventors: Srinath Madasu, Houston, TX (US); Nishant Raizada, Houston, TX (US); Keshava Rangarajan, Sugarland, TX (US); Robello Samuel, Cypress, TX (US)

(73) Assignee: Landmark Graphics Corporation, Houston, TX (US)

( * ) Notice: Subject to any disclaimer, the term of this patent is extended or adjusted under 35 U.S.C. 154(b) by 784 days.

(21) Appl. No.: 16/629,231

(22) PCT Filed: Mar. 9, 2018

(86) PCT No.: PCT/US2018/021703
§ 371 (c)(1),
(2) Date: Jan. 7, 2020

(87) PCT Pub. No.: WO2019/036063
PCT Pub. Date: Feb. 21, 2019

(65) Prior Publication Data
US 2020/0190957 A1 Jun. 18, 2020

Related U.S. Application Data

(60) Provisional application No. 62/547,133, filed on Aug. 18, 2017.

(51) Int. Cl.
E21B 44/02 (2006.01)
G06N 20/00 (2019.01)
(Continued)

(52) U.S. Cl.
CPC ............ E21B 44/02 (2013.01); E21B 7/04 (2013.01); E21B 45/00 (2013.01); G06N 20/00 (2019.01)

(58) Field of Classification Search
CPC . E21B 44/00; E21B 44/02; E21B 7/04; E21B 45/00; E21B 2200/22; G06N 20/00
See application file for complete search history.

(56) References Cited

U.S. PATENT DOCUMENTS 9,988,880 B2 * 6/2018 Dykstra .............. E21B 41/0092
10,677,052 B2 * 6/2020 Storm, Jr. ............. G01V 11/00
(Continued)

FOREIGN PATENT DOCUMENTS

CN 102472825 A * 5/2012 ............ E21B 44/00
WO 2016160005 A1 10/2016
WO WO-2016160005 A1 * 10/2016 ............ E21B 41/00

OTHER PUBLICATIONS

G. S. Payette and et al, "A Real-Time Well-Site Based Surveillance and Optimization Platform for Drilling: Technology, Basic Workflows and Field Results", SPE/IADC Drilling Conference and Exhibition held in The Hague, The Netherlands, Mar. 14-16, 2017 (Year: 2017).*

(Continued)

Primary Examiner — Douglas Kay
(74) Attorney, Agent, or Firm — Kilpatrick Townsend & Stockton LLP

(57) ABSTRACT

A system and method for controlling a drilling tool inside a wellbore makes use of projection of optimal rate of penetration (ROP) and optimal controllable parameters such as weight-on-bit (WOB), and rotations-per-minute (RPM) for drilling operations. Optimum controllable parameters for drilling optimization can be predicted using a data generation model to produce synthesized data based on model physics, an ROP model, and stochastic optimization. The (Continued)

synthetic data can be combined with real-time data to extrapolate the data across the WOB and RPM space. The values for WOB an RPM can be controlled to steer a drilling tool. Examples of models used include a non-linear model, a linear model, a recurrent generative adversarial network (RGAN) model, and a deep neural network model.

17 Claims, 7 Drawing Sheets

(51) Int. Cl.
  *E21B 7/04* (2006.01)
  *E21B 45/00* (2006.01)

(56) References Cited

U.S. PATENT DOCUMENTS

| | | | |
|---|---|---|---|
| 2011/0120222 A1* | 5/2011 | Scholte | G01H 3/125 |
| | | | 73/603 |
| 2011/0220410 A1 | 9/2011 | Aldred et al. | |
| 2013/0229298 A1* | 9/2013 | Eckstein | G01S 13/726 |
| | | | 342/107 |
| 2015/0081222 A1 | 3/2015 | Laing et al. | |
| 2015/0227841 A1 | 8/2015 | Laing et al. | |
| 2015/0356450 A1 | 12/2015 | Dursun et al. | |
| 2016/0230530 A1* | 8/2016 | Dykstra | E21B 44/04 |
| 2016/0356144 A1* | 12/2016 | Toti | E21B 44/00 |
| 2018/0025269 A1* | 1/2018 | Dursun | E21B 41/00 |
| | | | 175/24 |
| 2018/0248895 A1* | 8/2018 | Watson | H04L 63/083 |
| 2018/0275658 A1* | 9/2018 | Iandola | G06F 30/20 |
| 2019/0120049 A1* | 4/2019 | Chen | E21B 47/12 |
| 2019/0169986 A1* | 6/2019 | Storm, Jr. | E21B 49/00 |
| 2019/0302310 A1* | 10/2019 | Fox | G01V 1/282 |
| 2019/0327501 A1* | 10/2019 | Walters | G06V 10/768 |

OTHER PUBLICATIONS

S. Zachary and et al "Multivariate extrapolation in the offshore environment", Applied Ocean Research 20 (1998) 273-295 (Year: 1998).*

Y-A Lin and D-C Li, "The Generalized-Trend-Diffusion modeling algorithm for small data sets in the early stages of manufacturing systems", European Journal of Operational Research 207 (2010) 121-130 (Year: 2010).*

T. De Vries and G. W. Taylor, "Dataset Augmentation In Feature Space", Workshop track—ICLR, International Conference on Learning Representations, Apr. 24-26, 2017, arxiv.org (Year: 2017).*

FR1856620, "Office Action", dated Mar. 18, 2019, 2 pages.

PCT/US2018/021703, "International Search Report and Written Opinion", dated Jun. 15, 2018, 14 pages.

Hyland, et al., "Real-Valued (Medical) Time Series Generation with Recurrent Conditional GANs," Available online at https://arxiv.org/abs/1706.02633, 13 pages.

Ezzatabadipour, et al. "Deep Learning as a Tool to Predict Flow Patterns in Two-Phase Flow," Available online at https://arxiv.org/pdf/1705.07117, 6 pages.

Snoek, et al., "Practical Bayesian Optimization of Machine Learning Algorithms," Available online at https://arxiv.org/pdf/1206.2944, 12 pages.

CA3,070,056, "Office Action", dated Dec. 14, 2021, 4 pages.

* cited by examiner

| ROP | WOB*RPM |
|---|---|
| 144.7976 | 1377 |
| 145.3234 | 1386 |
| 145.8477 | 1395 |
| 146.3705 | 1404 |
| 146.8919 | 1413 |
| 147.4117 | 1422 |
| 147.9301 | 1431 |
| 148.4471 | 1440 |
| 399.1708 | 8520 |
| 400.7325 | 8580 |
| 402.2893 | 8640 |
| 403.8413 | 8700 |
| 405.3886 | 8760 |
| 406.9312 | 8820 |
| 408.4691 | 8880 |
| 410.0025 | 8940 |
| 411.5313 | 9000 |
| 413.0555 | 9060 |
| 414.5753 | 9120 |
| 416.0907 | 9180 |
| 417.6017 | 9240 |
| 419.1083 | 9300 |
| 420.6106 | 9360 |
| 422.1087 | 9420 |
| 423.6025 | 9480 |
| 425.0922 | 9540 |
| 426.5777 | 9600 |
| 32.38401 | 473.7943 |
| 119.6253 | 348.8083 |
| 145.6078 | 727.2878 |
| 144.2257 | 912.4466 |
| 134.4597 | 830.4047 |
| 142.5822 | 704.6896 |
| 156.7393 | 985.3831 |
| 148.0313 | 976.565 |

702 (braces first group starting 144.7976 through 426.5777)
704 (braces second group starting 32.38401 through 148.0313)

FIG. 7

RATE OF PENETRATION OPTIMIZATION FOR WELLBORES USING MACHINE LEARNING

TECHNICAL FIELD

The present disclosure relates generally to devices for use in well systems. More specifically, but not by way of limitation, this disclosure relates to real-time automated closed-loop control of a drilling tool during the drilling of a wellbore.

BACKGROUND

A well (e.g., an oil or gas well) includes a wellbore drilled through a subterranean formation. The conditions inside the subterranean formation where the drill bit is passing when the wellbore is being drilled continuously change. For example, the formation through which a wellbore is drilled exerts a variable force on the drill bit. This variable force can be due to the rotary motion of the drill bit, the weight applied to the drill bit, and the friction characteristics of each strata of the formation. A drill bit may pass through many different materials (e.g., rock, sand, shale, clay, etc.) in the course of forming the wellbore and adjustments to various drilling parameters are sometimes made during the drilling process by a drill operator to account for observed changes.

BRIEF DESCRIPTION OF THE DRAWINGS

FIG. 7 is a table illustrating combined data including synthetic and real-time data according to some aspects.

DETAILED DESCRIPTION

Certain aspects and features relate to a process that improves, and makes more efficient, the projection of optimal rate of penetration (ROP) and optimal controllable parameters, such as weight-on-bit (WOB) and rotations-per-minute (RPM), for drilling operations. The optimum controllable parameters can be computed, and the parameters can be utilized for real-time, closed-loop control and automation of a drilling tool.

Optimum controllable parameters for drilling optimization can be predicted using a data generation model to produce synthesized data based on model physics, an ROP model, model training, and stochastic optimization. The synthetic data can be combined with real-time data to extrapolate the data across the WOB and RPM variable space. The data can be used for teaching a model. The trained model can be used in an optimizer to provide an optimized ROP. This information can be helpful in advising, in real time, the optimum controllable parameters for drilling.

A method of operating a drilling tool according to some aspects includes generating synthetic data about rate of penetration (ROP), weight-on-bit (WOB), and rotations-per-minute (RPM) using real-time data associated with the drilling tool and combining the synthetic data with the real-time data to form combined data. The combined data is used to teach an ROP model and produce a trained ROP model. A value for ROP is projected using stochastic optimization of the trained ROP model. Corresponding values for WOB and RPM are also projected using the trained ROP model. The values for WOB and RPM are controlled to steer a drilling tool. Examples of an ROP model include a non-linear model, a linear model, a recurrent generative adversarial network (RGAN) model, and a deep neural network model.

Figure 1:
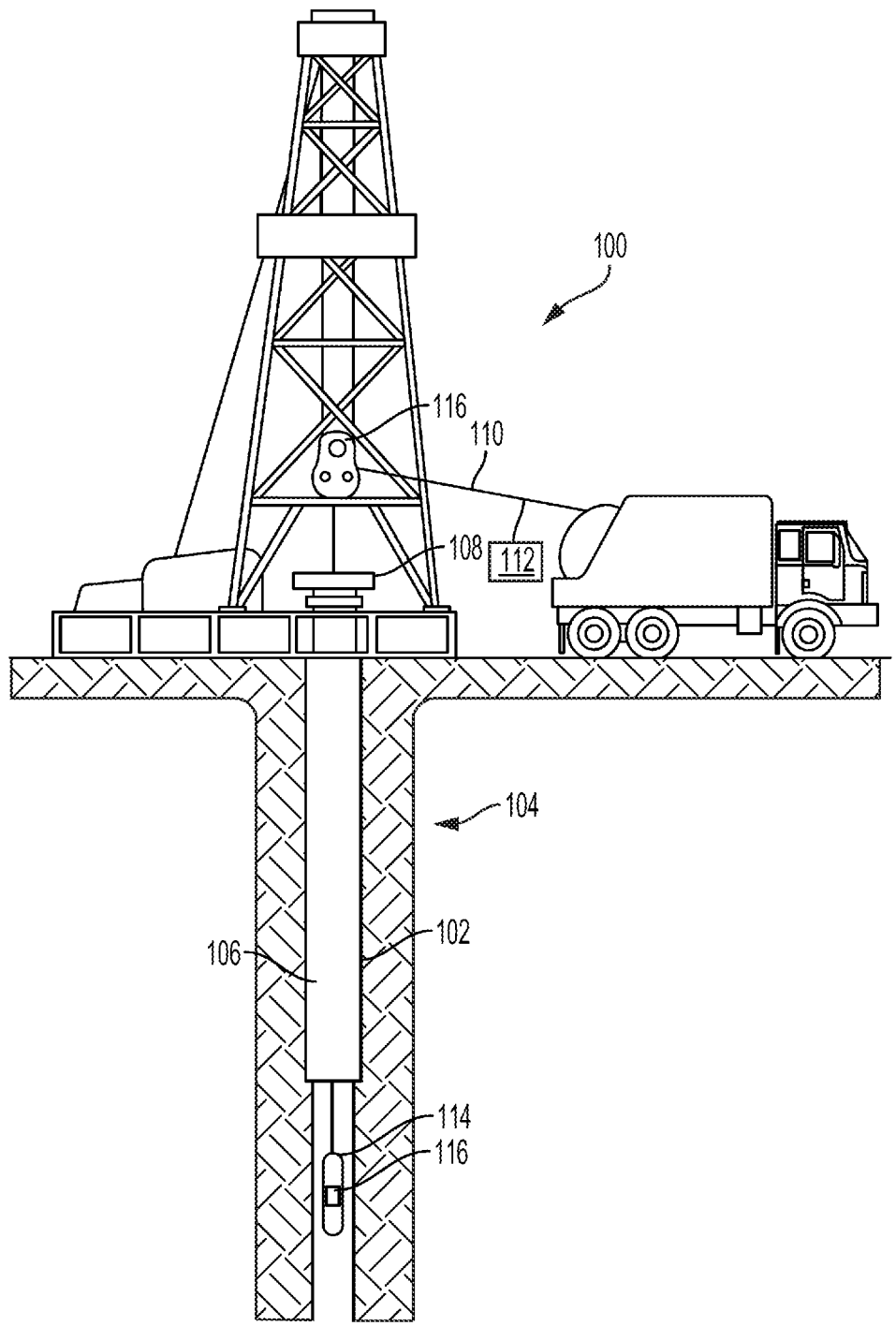
FIG. 1 is a cross-sectional view of an example of a well system that includes a system for steering a drilling tool according to some aspects.

FIG. 1 is a cross-sectional side view of an example of a well system 100 according to some aspects. The well system 100 includes a wellbore 102 extending through a hydrocarbon bearing subterranean formation 104. In this example, the wellbore 102 is vertical, but in other examples the wellbore 102 can additionally or alternatively be horizontal or deviated.

In this example, the wellbore 102 includes a casing string 106 (e.g., a metal casing) extending from the well surface 108 into the subterranean formation 104. The casing string 106 can provide a conduit via which formation fluids, such as production fluids produced from the subterranean formation 104, can travel from the wellbore 102 to the well surface 108. In other examples, the wellbore 102 can lack the casing string 106.

The wellbore 102 can include a drilling tool 114 for extending the wellbore 102. Additional tools can also be included, such as a safety tool, valve tool, packer tool, monitoring tool, formation testing tool, a logging-while-drilling tool, or any combination of these. In some examples, a tool is deployed in the wellbore 102 using a wireline 110, slickline, or coiled tube, which can be wrapped around a winch 118 or pulley at the well surface 108.

The well system 100 also includes a computing device 112. The computing device 112 can be positioned at the well surface 108 or elsewhere (e.g., offsite). The computing device 112 may be in communication with the drilling tool 114, a sensor, or another electronic device. For example, the computing device 112 can have a communication interface for transmitting information to and receiving information from another communication interface 116 of the drilling tool 114.

In some examples, the computing device 112 can receive information from downhole (or elsewhere) in substantially real time, which can be referred to as real-time data. The real time data can include information related to the well system 100. For example, the drilling tool 114 can stream real-time data to the computing device 112, where the real-time data includes information about the orientation or location of the drilling tool 114 in the wellbore 102, or the ROP, WOB, or RPM for the drilling tool 114 through the wellbore 102. The computing device 112 can use the real-time data at least in part to teach an ROP model, which a well operator may use to determine one or more controllable parameters for performing an operation in the well system 100. For example, the computing device 112 can use the real-time data to teach a model that can be optimized to provide a predicted ROP for the drilling tool 114 through the subterranean formation 104 and predicted controllable parameters to be applied to drilling tool 114. A more specific example of the computing device 112 is described in greater detail below with respect to FIG. 3.

Figure 2:
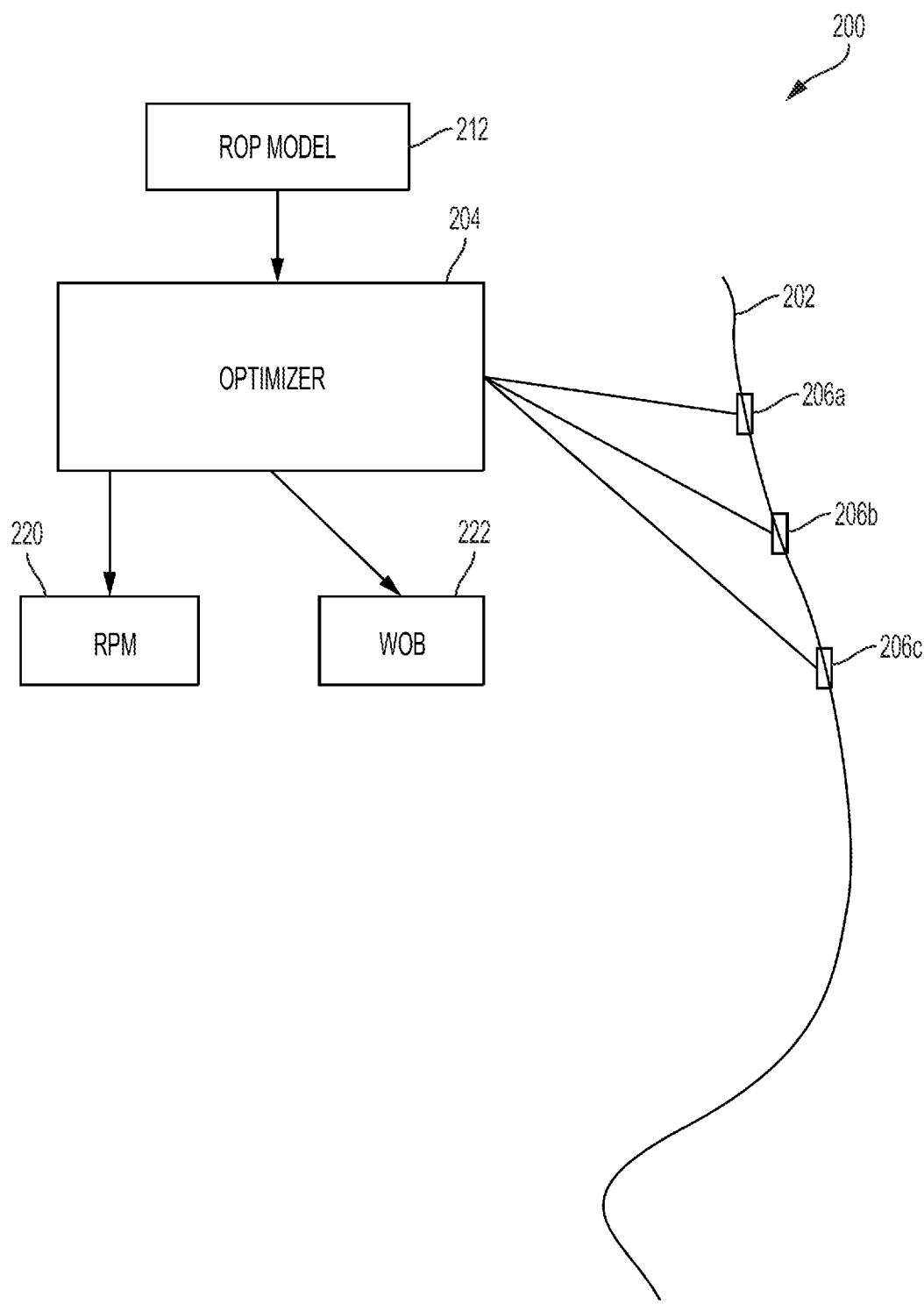
FIG. 2 is a schematic diagram of a system for steering a drilling tool according to some aspects.

FIG. 2 is a schematic diagram of an example of a system 200 for steering a drilling tool along projected path 202 of a wellbore being extended by the drilling tool. System 200 includes an optimizer 204 that can be executed by a processor to control the drilling tool connected by applying a stochastic optimization using real-time data received at each iteration, 206a, 206b, and 206c. Each iteration corresponds to a drilling sequence and drilling sequences occur at a plurality of measured depths. Optimizer 204 can be subject to range constraints dictated by engineering constraints. Range constraints can come, for example, from disruptive resonances in the drillstring at certain RPMs that need to be avoided. Also, the rate of penetration of the drilling tool may not exceed that which creates the maximum amount of debris that can be removed from the wellbore by fluid pumping in at a specified amount of time. Optimizer 204 produces values for controllable parameters that can be applied to the drilling tool by optimizing an ROP model 212. Optimizer 204 and ROP model 212 are, in this example, included in computing device 112 of FIG. 1. Such controllable parameters include drill bit speed (here in units of RPM) 220 and WOB 222.

Figure 3:
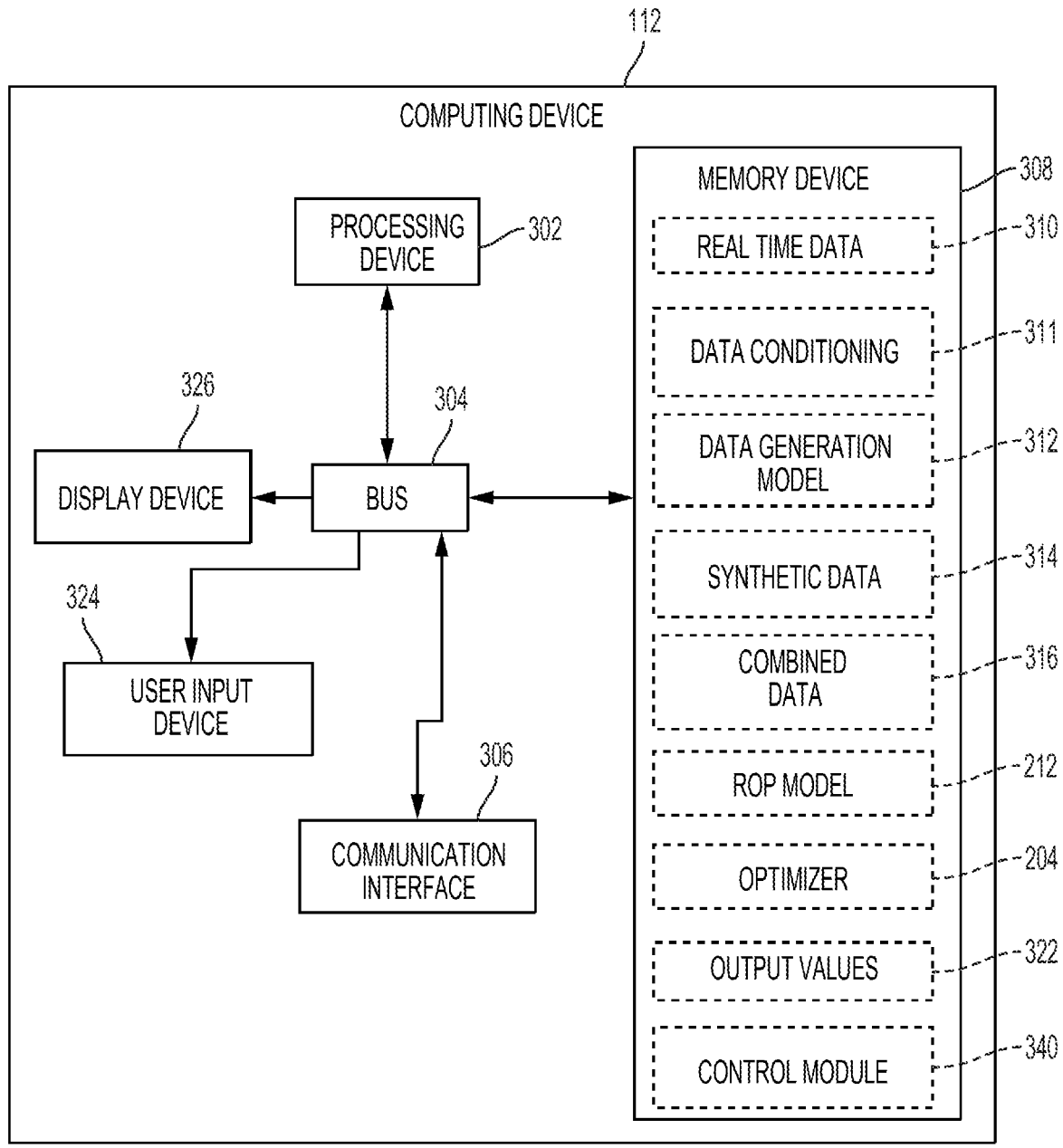
FIG. 3 is a block diagram of a computing system for steering a drilling tool according to some aspects.

FIG. 3 depicts a block diagram of a computing device 112 according to one example. The computing device 112 includes a processing device 302, a bus 304, a communication interface 306, a non-transitory memory device 308, a user input device 324, and a display device 326. In some examples, some or all of the components shown in FIG. 3 can be integrated into a single structure, such as a single housing. In other examples, some or all of the components shown in FIG. 3 can be distributed (e.g., in separate housings) and in communication with each other.

The processing device 302 can execute one or more operations for optimizing parameters for controlling a drilling tool. The processing device 302 can execute instructions stored in the memory device 308 to perform the operations. The processing device 302 can include one processing device or multiple processing devices. Non-limiting examples of the processing device 302 include a Field-Programmable Gate Array ("FPGA"), an application-specific integrated circuit ("ASIC"), a microprocessing device, etc.

The processing device 302 is communicatively coupled to the memory device 308 via the bus 304. The non-volatile memory device 308 may include any type of memory device that retains stored information when powered off. Non-limiting examples of the memory device 308 include electrically erasable and programmable read-only memory ("EEPROM"), flash memory, or any other type of non-volatile memory. In some examples, at least some of the memory device 308 can include a medium from which the processing device 302 can read instructions. A non-transitory computer-readable medium can include electronic, optical, magnetic, or other storage devices capable of providing the processing device 302 with computer-readable instructions or other program code. Non-limiting examples of a non-transitory computer-readable medium include (but are not limited to) magnetic disk(s), memory chip(s), read-only memory (ROM), random-access memory ("RAM"), an ASIC, a configured processing device, optical storage, or any other medium from which a computer processing device can read instructions. The instructions can include processing device-specific instructions generated by a compiler or an interpreter from code written in any suitable computer-programming language, including, for example, C, C++, C#, etc.

In the example of FIG. 3, the memory device 308 includes real-time data 310. The real-time data 310 can be communicated to the computing device 112 from one or more well tools or sensors positioned in one or more wellbores. The memory device 308 also includes a data-conditioning module 311 that can condition or filter the real-time data 310 prior to the real-time data 310 being further processed. The memory device 308 includes a data generation model 312. The data generation model 312 can be a software application for generating synthetic data for using in optimizing parameters for controlling a wellbore. The data created by the data generation model 312 can be stored as the synthetic data 314 in the memory device 308. The memory device 308 includes combined data 316, which can be a combination of the synthetic data 314 and the real-time data 310. An example of the combined data 316 is shown in chart form in FIG. 7, wherein "WOBRPM" is the product of WOB and RPM.

Continuing with FIG. 3, the memory device 308 includes the ROP model 212, also shown in FIG. 2. The ROP model 212 can be a software application for optimizing a rate of penetration for a drilling operation. The generated data from the data generation model 312 can be used to teach the ROP model 212. In some examples, the data generation model 312 and the ROP model 212 are each a deep neural network model with three hidden layers and seventeen nodes in each of the chosen layers. The data generation model and the ROP model can in other examples be linear, non-linear, or an RGAN model. In one example, a non-linear model can be used for the example of data in FIG. 5. In another example, the deep neural network model can be used for the example of data in FIG. 6.

Additionally or alternatively, the memory device 308 includes the optimizer 204, also shown in FIG. 2. The optimizer 204 can be a software application for performing stochastic Bayesian optimization of an ROP objective function built to obtain optimum values for controllable parameters such as WOB and RPM. Results from the optimizer can be stored as output values 322 in the memory device 308. The outputs can be applied to a drilling tool by control module 340, which is executable by the processing device to steer the drilling tool.

In some examples, the computing device 112 includes a communication interface 306. The communication interface 306 can represent one or more components that facilitate a network connection or otherwise facilitate communication between electronic devices. Examples include, but are not limited to, wired interfaces such as Ethernet, USB, IEEE 1394, and/or wireless interfaces such as IEEE 802.11, Bluetooth, near-field communication (NFC) interfaces, RFID interfaces, or radio interfaces for accessing cellular telephone networks (e.g., transceiver/antenna for accessing a CDMA, GSM, UMTS, or other mobile communications network).

In some examples, the computing device 112 includes a user input device 324. The user input device 324 can represent one or more components used to input data. Examples of the user input device 324 can include a keyboard, mouse, touchpad, button, or touch-screen display, etc.

In some examples, the computing device 112 includes a display device 326. The display device 326 can represent one or more components used to output data. Examples of the display device 326 can include a liquid-crystal display (LCD), a television, a computer monitor, a touch-screen display, etc. In some examples, the user input device 324 and the display device 326 can be a single device, such as a touch-screen display.

Figure 4:
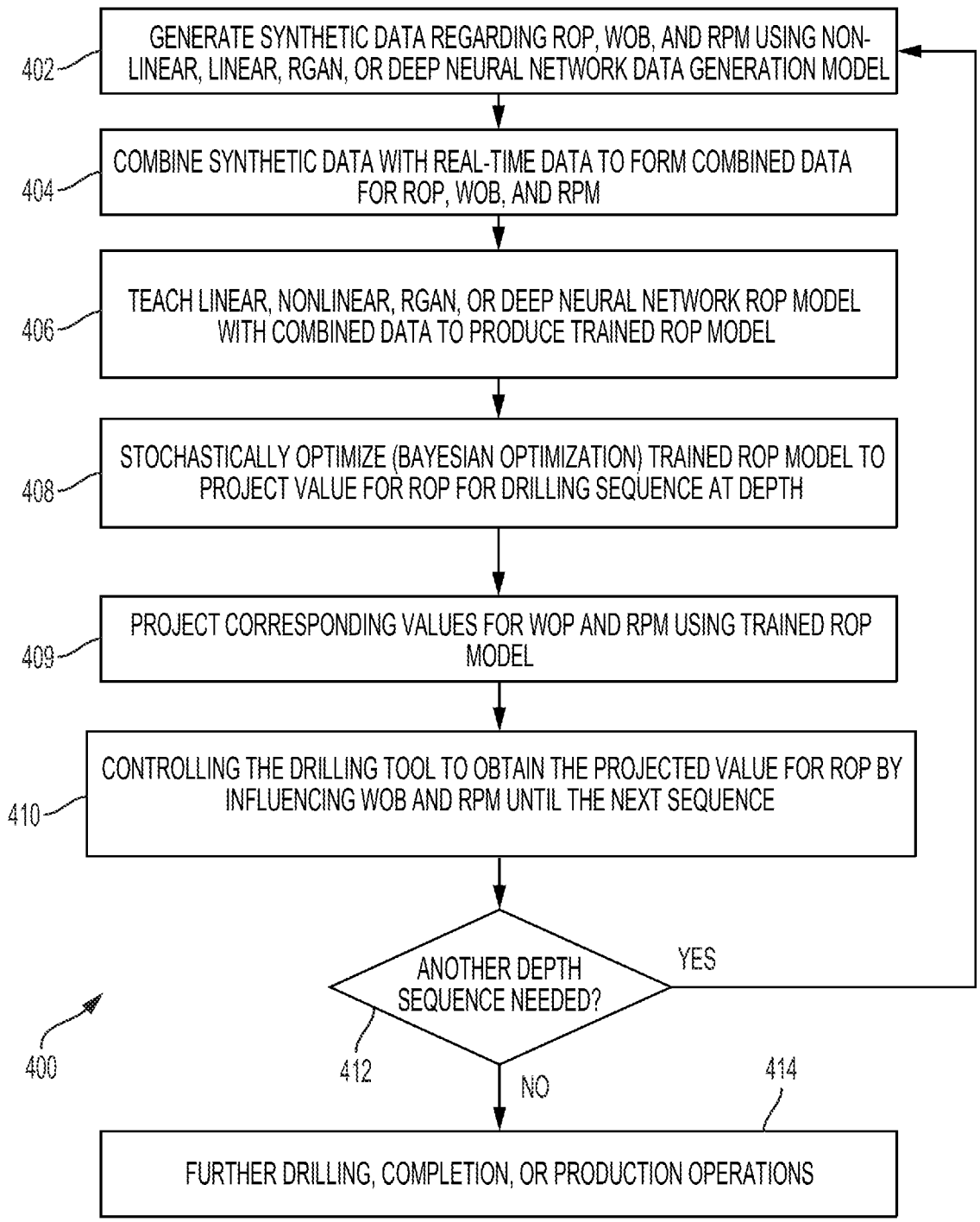
FIG. 4 is an example of a flowchart of a process for steering a drilling tool according to some aspects.

By using real-time field data to generate synthetic data and teach the ROP model, and optimizing predictions from the ROP model using range constraints, drilling control operations can be enhanced. FIG. 4 is an example of a flowchart of a process 400 for automated real-time steering of a drilling tool during formation or extension of a wellbore by optimizing predictions from the ROP model described in FIG. 2 and FIG. 3. At block 402 of process 400 processing device 302 generates synthetic data 314 regarding ROP, WOB, and RPM using non-linear, linear, RGAN, or deep neural network data generation model. The data generation model 312 has the ability to utilize real-time data as inputs and the model is ultimately taught (trained). An example of a deep neural network data generation model is a long short-term memory (LSTM) model. An example of a non-linear model is a model that takes the form:

$$ROP = K(WOB*RPM)^\alpha$$

where K is a constant.

At block 404 of process 400, the synthetic data 314 and real-time data 310 are combined by processing device 302 to form combined data 316 for ROP, WOB, and RPM. Combining the real-time and synthetic data allows training and optimization with data that is more extensive than might be possible if using real-time data alone, since it is not always possible to obtain real-time data across a full data value range in a reasonable amount of time. It is possible in some situations that optimal values do not occur within the domain of real-time data obtained. In such a case, optimal values can be found in the synthetic data since the synthetic data includes points corresponding to data values outside the real-time data points. Combining real-time data with synthetic data ensures optimal values will be within the range of available data.

At block 406 of FIG. 4, the data generated in block 404 is used to teach the ROP model for an objective function needed for optimization. Processing device 302 teaches ROP model 212 using the combined data 316 for training. As in the case of the data generation model, the ROP model 212 can be non-linear, linear, organized as an RGAN model, deep neural network model such as an LSTM model. In some examples, a deep neural network model includes multiple hidden layers and each hidden layer includes a plurality of nodes. In one example, a deep neural network model with 3 hidden layers with 17 nodes in each of the layers is used.

Still referring to FIG. 4, at block 408, processing device 302 stochastically optimizes the trained ROP model to project a value for ROP for a drilling sequence at depth. In one example, Bayesian optimization is used. An ROP objective function is built by processing device 302 is used at block 409 to produce optimum values for WOP and RPM corresponding to the projected ROP. At block 410, the drilling tool 114 is controlled by processing device 302 to obtain the projected value for ROP by influencing RPM and WOB. If the wellbore is still being formed at block 412 and another drilling sequence is needed for an additional depth, processing returns to block 402 and the process described above is repeated. Otherwise, the process 400 continues to further drilling, completion, or production operations at block 414.

Figure 5:
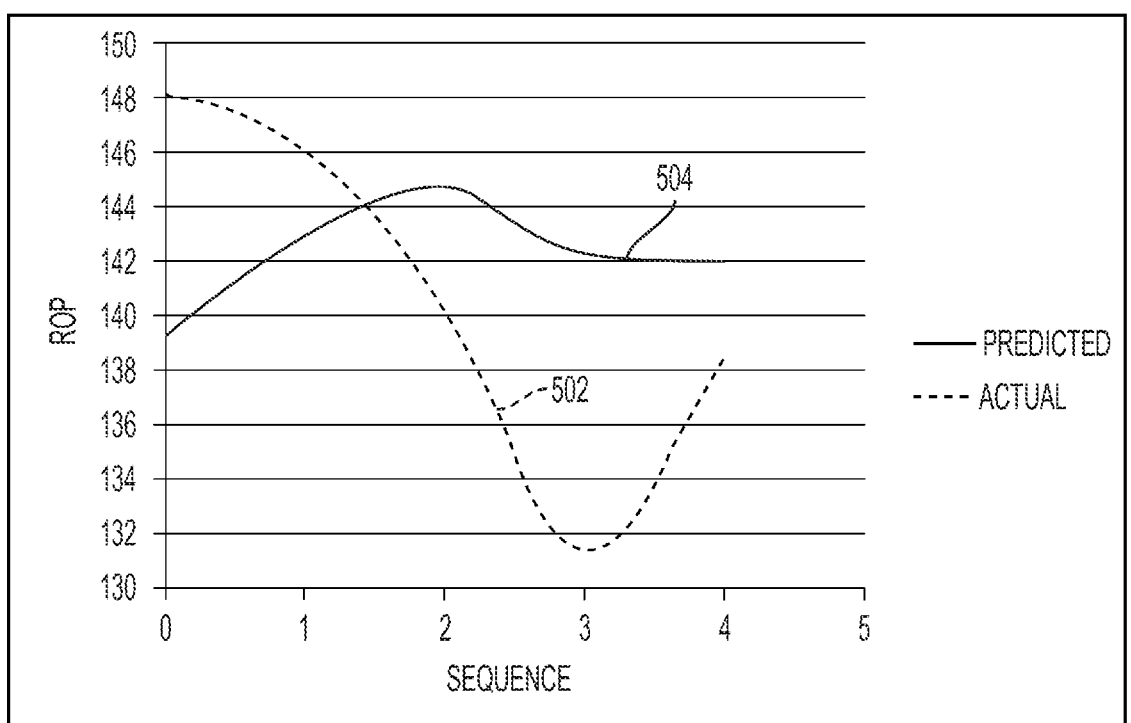
FIG. 5 is a graph comparing actual and projected values of rate of penetration using a non-linear rate of penetration model according to some aspects.

FIG. 5 is an example graph 500 comparing actual and predicted values of rate of penetration using a non-linear ROP model according to some aspects. Actual values are indicated by line 502 and predicted values are indicated by line 504.

Figure 6:
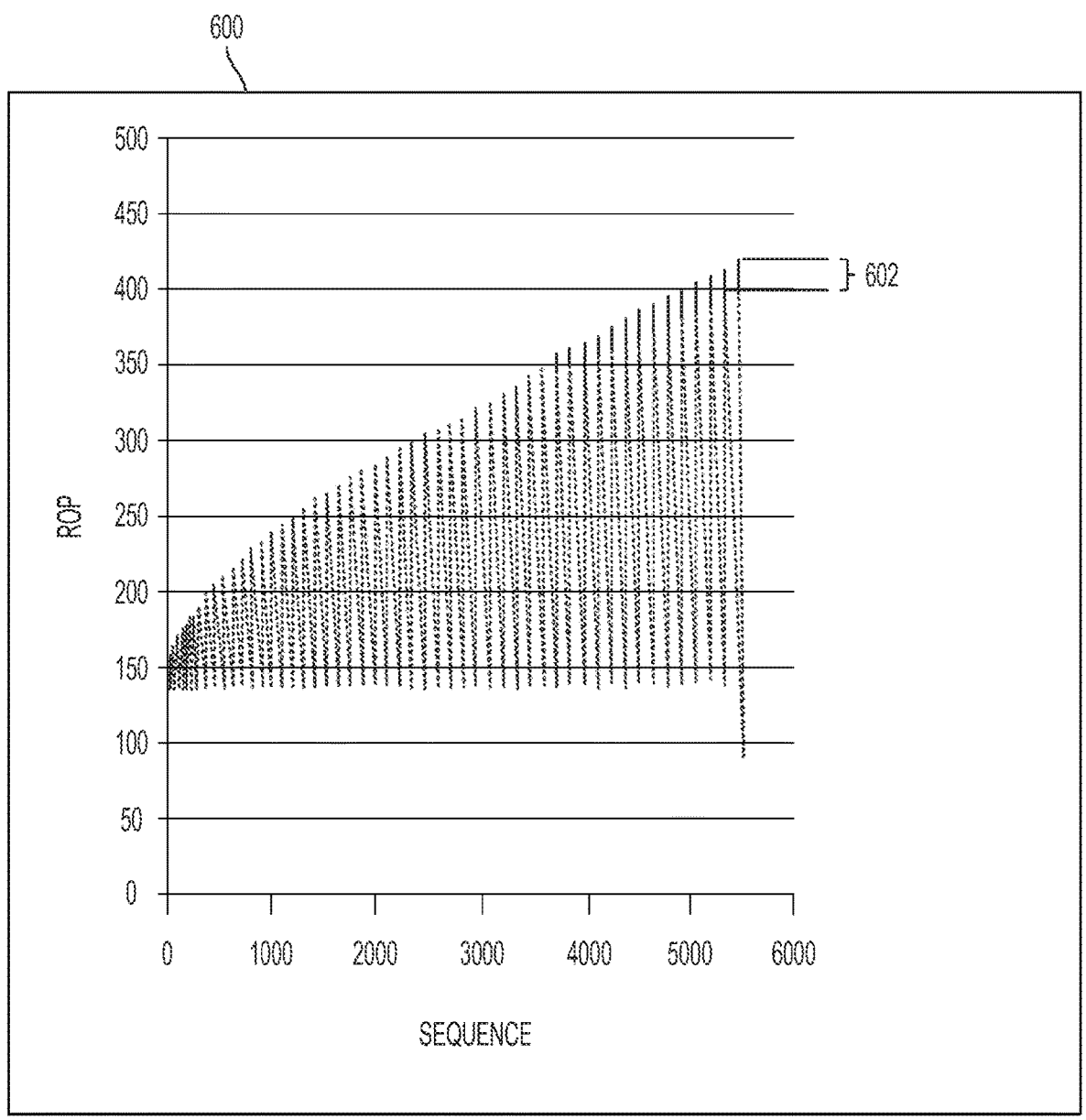
FIG. 6 is a graph comparing actual and projected values of rate of penetration using a deep neural network rate of penetration model according to some aspects.

FIG. 6 is an example graph 600 comparing actual and predicted values of rate of penetration using a deep neural network model with three hidden layers and 17 nodes in each of the layer. In this example, a learning rate of 0.0002 and a momentum optimizer were chosen. The model-predicted values and actual values are illustrated with respect to the example graph 600, but are almost indistinguishable except for the area between sequence 5000 and sequence 6000. In this area, the higher projected values are above the actual values by an amount 602.

FIG. 7 is a table 700 illustrating example combined data according to some aspects. The example synthetic data 702 and the example real-time data 704 are combined as described above for teaching the non-linear model discussed. WOBRPM is the product of WOB*RPM.

In some aspects, systems, devices, and methods for ROP optimization for controlling a drilling tool are provided according to one or more of the following examples. As used below, any reference to a series of examples is to be understood as a reference to each of those examples disjunctively (e.g., "Examples 1-4" is to be understood as "Examples 1, 2, 3, or 4").

Example #1: A system includes a drilling tool, and a computing device in communication with the drilling tool. The computing device includes a non-transitory memory device comprising instructions that include a data generation model that is executable by the computing device to generate synthetic data about rate of penetration, weight-on-bit, and rotations-per-minute using real-time data associated with the drilling tool, and to combine the synthetic data with the real-time data to form combined data. The instructions also include a rate of penetration model that is teachable using the combined data and that is executable by the computing device to use stochastic optimization to project a value for the rate of penetration per drilling sequence using range constraints and to project corresponding values for weight-on-bit and rotations-per-minute. The instructions also include a control module that is executable by the computing device to steer the drilling tool using corresponding values for at least one of the weight-on-bit or the rotations-per-minute.

Example #2: The system of example 1 wherein the synthetic data includes points whose values are outside of the real-time data point values.

Example #3: The system of example(s) 1 or 2 wherein at least one of the data generation model or the rate of penetration model comprises a linear model or a non-linear model.

Example #4: The system of example(s) 1-3 wherein at least one of the data generation model or the rate of penetration model comprises a recurrent generative adversarial network (RGAN).

Example #5: The system of example(s) 1-4 wherein at least one of the data generation model or the rate of penetration model comprises a deep neural network model including a plurality of hidden layers, each hidden layer comprising a plurality of nodes.

Example #6: The system of example(s) 1-5 wherein the deep neural network model includes 17 hidden layers, each comprising 3 nodes.

Example #7: The system of example(s) 1-6 wherein the stochastic optimization comprises Bayesian optimization and wherein the drilling tool is steered by controlling the drilling tool to obtain the value of the rate of penetration by influencing the corresponding values for weight-on-bit and rotations-per-minute.

Example #8: A method of operating a drilling tool, the method includes generating synthetic data about rate of penetration, weight-on-bit, and rotations-per-minute using real-time data associated with the drilling tool and combining the synthetic data with the real-time data to form combined data. The method also includes teaching a rate of penetration model using the combined data to produce a trained rate of penetration model, projecting a value for the rate of penetration per drilling sequence using stochastic optimization of the trained rate of penetration model subject to range constraints, projecting corresponding values for weight-on-bit and rotations-per-minute using the trained rate of penetration model, and steering the drilling tool using the corresponding values for at least one of the weight-on-bit or the rotations-per-minute.

Example #9: The method of example 8 wherein the synthetic data includes points whose values are outside of the real-time data point values.

Example #10: The method of example(s) 8 or 9 wherein the trained rate of penetration model comprises a linear model or a non-linear model.

Example #11: The method of example(s) 8-10 wherein the trained rate of penetration model comprises a recurrent generative adversarial network (RGAN).

Example #12: The method of example(s) 8-11 wherein the trained rate of penetration model comprises a deep neural network model including a plurality of hidden layers, each hidden layer comprising a plurality of nodes.

Example #13: The method of example(s) 8-12 wherein the deep neural network model includes 17 hidden layers, each comprising 3 nodes.

Example #14: The method of example(s) 8-13 wherein the stochastic optimization comprises Bayesian optimization and wherein the drilling tool is steered by controlling the drilling tool to obtain the value of the rate of penetration by influencing the corresponding values for weight-on-bit and rotations-per-minute.

Example #15: The method of example(s) 8-14 further comprising repeating the teaching of the rate of penetration model, the projecting of the value for the rate of penetration per drilling sequence, and the projecting of corresponding values for weight-on-bit and rotations-per-minute for each of a plurality of measured depths.

Example #16: A non-transitory computer-readable medium that includes instructions that are executable by a processing device for causing the processing device to perform the method of example(s) 8-15.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system comprising:
    a drilling tool; and
    a computing device in communication with the drilling tool, the computing device including a non-transitory memory device comprising instructions that include:
        a data generation model that is executable by the computing device to generate synthetic data for rate of penetration, weight-on-bit, and rotations-per-minute using real-time data associated with the drilling tool, and to combine the synthetic data with the real-time data to form combined data, the synthetic data including, outside values of the real-time data, optimized values for the rate of penetration, the weight-on-bit, and the rotations-per-minute;
        a rate of penetration model that is trained using the combined data and that is executable by the computing device to use stochastic optimization to project a value for the rate of penetration per drilling sequence using range constraints and to project corresponding values for weight-on-bit and rotations-per-minute, wherein at least one of the data generation model or the rate of penetration model comprises a recurrent generative adversarial network (RGAN); and
        a control module that is executable by the computing device to steer the drilling tool using the corresponding values for at least one of the weight-on-bit or the rotations-per-minute.

2. The system of claim 1 wherein the synthetic data includes points outside a domain of the real-time data.

3. The system of claim 1 wherein at least one of the data generation model or the rate of penetration model comprises a linear model or a non-linear model.

4. The system of claim 1 wherein at least one of the data generation model or the rate of penetration model comprises a deep neural network model including a plurality of hidden layers, each hidden layer comprising a plurality of nodes.

5. The system of claim 1 wherein the stochastic optimization comprises Bayesian optimization and wherein the drilling tool is steered by controlling the drilling tool to obtain the value of the rate of penetration by influencing the corresponding values for weight-on-bit and rotations-per-minute.

6. A method of operating a drilling tool, the method comprising:
    generating synthetic data for rate of penetration, weight-on-bit, and rotations-per-minute using real-time data associated with the drilling tool, the synthetic data including, outside a values of the real-time data, optimized values for the rate of penetration, the weight-on-bit, and the rotations-per-minute;
    combining the synthetic data with the real-time data to form combined data;
    training a rate of penetration model using the combined data to produce a trained rate of penetration model, wherein the trained rate of penetration model comprises a recurrent generative adversarial network (RGAN);
    projecting a value for the rate of penetration per drilling sequence using stochastic optimization of the trained rate of penetration model subject to range constraints;
    projecting corresponding values for weight-on-bit and rotations-per-minute using the trained rate of penetration model; and
    steering the drilling tool using the corresponding values for at least one of the weight-on-bit or the rotations-per-minute.

7. The method of claim 6 wherein the synthetic data includes points outside a domain of the real-time data.

8. The method of claim 6 wherein the trained rate of penetration model comprises a linear model or a non-linear model.

9. The method of claim 6 wherein the trained rate of penetration model comprises a deep neural network model including a plurality of hidden layers, each hidden layer comprising a plurality of nodes.

10. The method of claim 6 wherein the stochastic optimization comprises Bayesian optimization and wherein the drilling tool is steered by controlling the drilling tool to obtain the value of the rate of penetration by influencing the corresponding values for weight-on-bit and rotations-per-minute.

11. The method of claim 6 further comprising repeating the training of the rate of penetration model, the projecting of the value for the rate of penetration per drilling sequence, and the projecting of corresponding values for weight-on-bit and rotations-per-minute for each of a plurality of measured depths.

12. A non-transitory computer-readable medium that includes instructions that are executable by a processing device for causing the processing device to perform operations comprising:
generating synthetic data for rate of penetration, weight-on-bit, and rotations-per-minute using real-time data associated with a drilling tool, the synthetic data including, outside values of the real-time data, optimized values for the rate of penetration, the weight-on-bit, and the rotations-per-minute;
combining the synthetic data with the real-time data to form combined data;
training a rate of penetration model using the combined data to produce a trained rate of penetration model, wherein the trained rate of penetration model comprises a recurrent generative adversarial network (RGAN);
projecting a value for the rate of penetration per drilling sequence using stochastic optimization of the trained rate of penetration model subject to range constraints;
projecting corresponding values for weight-on-bit and rotations-per-minute using the trained rate of penetration model; and
outputting commands for steering the drilling tool using the corresponding values for at least one of the weight-on-bit or the rotations-per-minute.

13. The non-transitory computer-readable medium of claim 12 wherein the synthetic data includes points outside a domain of the real-time data.

14. The non-transitory computer-readable medium of claim 12 wherein the trained rate of penetration model comprises a linear model or a non-linear model.

15. The non-transitory computer-readable medium of claim 12 wherein the trained rate of penetration model comprises a deep neural network model including a plurality of hidden layers, each hidden layer comprising a plurality of nodes.

16. The non-transitory computer-readable medium of claim 12 wherein the stochastic optimization comprises Bayesian optimization and wherein the drilling tool is steered by controlling the drilling tool to obtain the value of the rate of penetration by influencing the corresponding values for weight-on-bit and rotations-per-minute.

17. The non-transitory computer-readable medium of claim 12 wherein the operations further comprise repeating the training of the rate of penetration model, the projecting of the value for the rate of penetration per drilling sequence, and the projecting of corresponding values for weight-on-bit and rotations-per-minute for each of a plurality of measured depths.

* * * * *